United States Patent
Thrash

(10) Patent No.: US 8,413,769 B2
(45) Date of Patent: Apr. 9, 2013

(54) BICYCLE BRAKE SYSTEM USING CAM MECHANISM

(75) Inventor: Gregory Wallace Thrash, Petaluma, CA (US)

(73) Assignee: The Hive Global Inc., Taichung (TW)

( * ) Notice: Subject to any disclaimer, the term of this patent is extended or adjusted under 35 U.S.C. 154(b) by 212 days.

(21) Appl. No.: 12/886,774

(22) Filed: Sep. 21, 2010

(65) Prior Publication Data

US 2012/0067675 A1    Mar. 22, 2012

(51) Int. Cl.
*B62L 3/00* (2006.01)

(52) U.S. Cl.
USPC .................................... 188/24.22; 188/24.12

(58) Field of Classification Search ............... 188/24.12, 188/24.16, 24.22
See application file for complete search history.

(56) References Cited

U.S. PATENT DOCUMENTS

| | | | | |
|---|---|---|---|---|
| 7,267,528 B2* | 9/2007 | Hsu et al. | ...................... | 415/229 |
| 7,802,660 B2* | 9/2010 | Tsai | ........................... | 188/24.13 |
| 7,975,810 B2* | 7/2011 | Liu et al. | .................... | 188/24.22 |
| 8,096,392 B2* | 1/2012 | Edwards et al. | ........... | 188/24.12 |
| 2009/0038894 A1* | 2/2009 | Liu et al. | .................... | 188/24.22 |
| 2009/0078512 A1* | 3/2009 | Edwards et al. | ........... | 188/24.12 |
| 2009/0194374 A1* | 8/2009 | Tsai | ........................... | 188/24.22 |

* cited by examiner

*Primary Examiner* — Robert A Siconolfi
*Assistant Examiner* — Anna Momper
(74) *Attorney, Agent, or Firm* — Rosenberg, Klein & Lee

(57) ABSTRACT

A bicycle brake system includes a first arm unit having a first arm and an engaging slot. A second arm unit is located in the engaging slot and has a second arm. The first and second arms each have a brake pad and the two brake pads face the two sides of the wheel rim. A cam unit has a contact piece connected to the second arm unit and a cam member pivotably connected to the first arm unit. The cam member includes a cam portion having a curved surface which is in contact with the contact piece. An operation unit is connected to the second arm unit and includes a cable which is fixed to the guide portion of the cam member. The cam member indirectly contacts the second arm unit so that the second arm unit does not wear out.

10 Claims, 7 Drawing Sheets

BICYCLE BRAKE SYSTEM USING CAM MECHANISM

FIELD OF THE INVENTION

The present invention relates to a bicycle brake system, and more particularly, to a C-type brake system which uses a cam mechanism to control the change of distance between the two arms so as to brake the wheel rim.

BACKGROUND OF THE INVENTION

The brake system is to reduce the speed of the wheels of the bicycles gradually until the bicycles are fully stopped. The brake system is a safety system to ensure that the riders control the bicycles safely. The brake system generally includes two brake pads located on two sides of the wheel rim or at the hub where the brake disk is connected.

For those brake systems with two brake pads on two sides of the rim, there are different types such as cantilever type, C type, V type and hydraulic type brake systems. The cantilever type includes two arms and the two brake cables are connected to the two arms, when braking, the two brake cables pull the arms simultaneously to pivot the arms toward the rim. The C type brake system has a fixed arm and a pivotal arm which is connected to the brake cable. When braking, the brake cable pulls the pivotal arms to stop the rim. The V type brake system is similar to the cantilever type and the difference is that the V type does not have a cable frame. The V type uses a solid and curved tube fixed to the pivot and drives the two arms which are pivoted toward the rim when braking.

The C type brake system is mainly used for the bicycles with narrow tires such as the road bicycles and includes cam type and lever type. The cam type means that the arms are driven by a cam mechanism when braking, and the lever type means that the arms are driven by a link mechanism.

U.S. Pat. No. 7,000,739 discloses a cam assisted wheel brake for a bicycle and comprises two arms mounted on a bolt, which provides a pivot point for the arms and a means for attachment of the brake to the fork of the bicycle. The brake incorporates a cam lever pivotably associated with the first arm and which engages a finger portion of the second arm and which comprising a first portion having a screw passing through a bore, a middle portion having a top edge having a curved edge portion, and a second portion pivotably connected to the first arm by a pin extending therethrough. The invention preferably has a quick release mechanism comprising a lever having a first pin extending therefrom, the pin pivotably engaging a bore in the first arm, and a second pin extending off axis from the first pin and pivotably engaging the second portion of the cam lever.

U.S. Pat. No. 3,628,635 discloses a side-pull bicycle brake mechanism and has major and minor arch members wherein it is required to pull upwards on one end of said major arch member by means of a wire in the case a pair of brake shoes are one-sided from the center, and so constructed that a small tensile force can achieve a big brake effect with easy handling by providing simple force magnifying means between the pulling member of said major arch member and said wire, so that said pair of brake shoes can be always actuated and applied equally to the two sides of bicycle rim.

U.S. Pat. No. 7,422,090 discloses a Caliper brake assembly for engaging a rimmed wheel on a frame of a bicycle. First and second brake arms are provided having brake pads supported on first ends thereof and bores extending therethrough for receiving a bolt for providing a pivot point for the pivotal attachment of the first and second brake arms to the bicycle frame. A spring is associated with the first and second arms to bias their brake pads away from the rimmed wheel. A rocker assembly is included in the caliper brake assembly which includes a rocker arm pivotally appended to a second end of the first brake arm, the rocker assembly having a region for fixedly receiving a control cable and a region for pivotally receiving a link, the link provided for pivotally connecting the rocker arm proximate to a second end of the second brake arm.

The first two references use a cam to contact the fixed arm so as to pivot the movable arm so that the brake pads are in contact with rim to stop the wheel. The third reference includes a link unit between the first and second arms, and the link unit is composed of a swing arm and a swing link. The link unit is connected to the first and second arms to control the operation of the second arm.

The present invention relates to a C-type brake system using a cam mechanism. It is noted that the cam mechanism of the prior references is directly in contact with the fixed arm and when the cam rotates the surface with different curvatures of the cam pivots the movable arm to move the brake pads toward the wheel rim.

However, the direct contact between the cam and the fixed arm will wear the fixed arm which has to be replaced after a period of use. The replacement of the fixed arm almost the work to replace the whole C type brake system. Besides, the contact surface of the cam and the fixed arm requires higher standard of machining and the fixed arm has specific outer contour surface which is different to receive high precise machining steps, this means a higher cost is involved. In addition, the resilient member between the overlapped arms is usually inclined because of the overlapped arms and this affects the resilient member to bounce back. The brake cables located above the cam are respectively and alternatively connected to the arms and not located on the same axis so that the bent brake cables do not provide a good braking action.

SUMMARY OF THE INVENTION

The present invention relates to a bicycle brake system and comprises a first arm unit having a pivot portion which is located between a first arm and a first pivotal end. An engaging slot is defined in the first pivotal end and a second arm unit is located in the engaging slot. The second arm unit has a pivot portion pivotably connected with the pivot portion of the first arm unit. The second arm unit includes a second arm and a connection portion. A first brake pad and a second brake pad are respectively connected to the first arm and the second arms. The two brake pads are located on two sides of the wheel rim. A cam unit has a contact piece connected to the second arm unit. A cam member has a pivotal portion pivotably connected to the pivotal end and is located in the engaging slot. The cam member includes a guide portion and a cam portion on two ends thereof. The cam portion has a curved surface which is in contact with the contact piece. An operation unit is connected to the connection portion and has a cable which extends through an end of the connection portion and is fixed to the guide portion. The end of the connection portion and the guide portion are located on a common axis. The cam member and the second arm unit are pivoted by pulling the cable, and the contact piece is pushed by the cam member to change a distance between the first and second brake pads.

The primary object of the present invention is to provide a bicycle brake system wherein the cam member is in contact with the contact piece rather than the second arm unit so that only the contact piece needs to be replaced and the second arm unit does not wear out.

The second object of the present invention is to provide a bicycle brake system wherein the contact piece is easily machined without need of special tools or clamping devices so that the cost for machining is reduced.

The third object of the present invention is to provide a bicycle brake system wherein the first and second arms are symmetrically and pivotably connected to each other so that the resilient member does not tilt. The cam member and the positioning member for securing the cable are located on a common axis such that the two arms bounce back precisely and the cable transfers the brake force efficiently.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
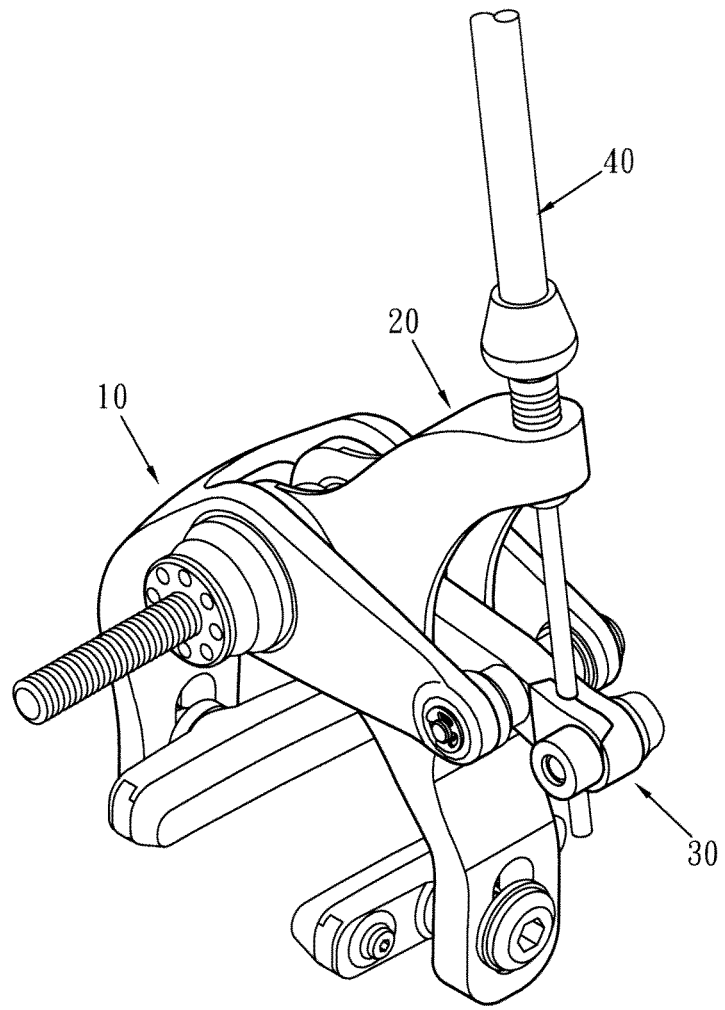
FIG. 1 is a perspective view to show the brake system of the present invention.
Figure 2:
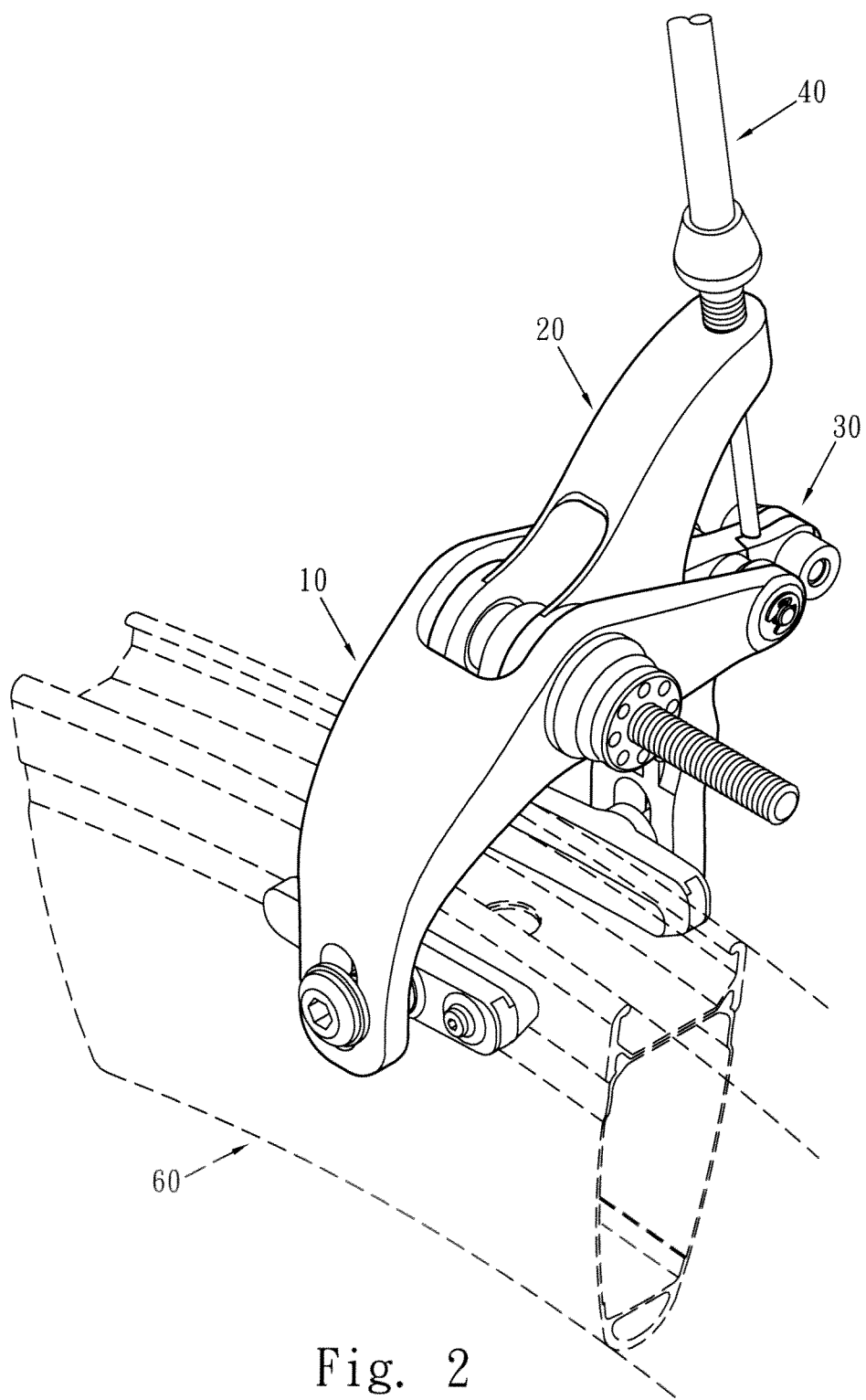
FIG. 2 is a perspective view to show that the brake system of the present invention is installed to a bicycle wheel.
Figure 3:
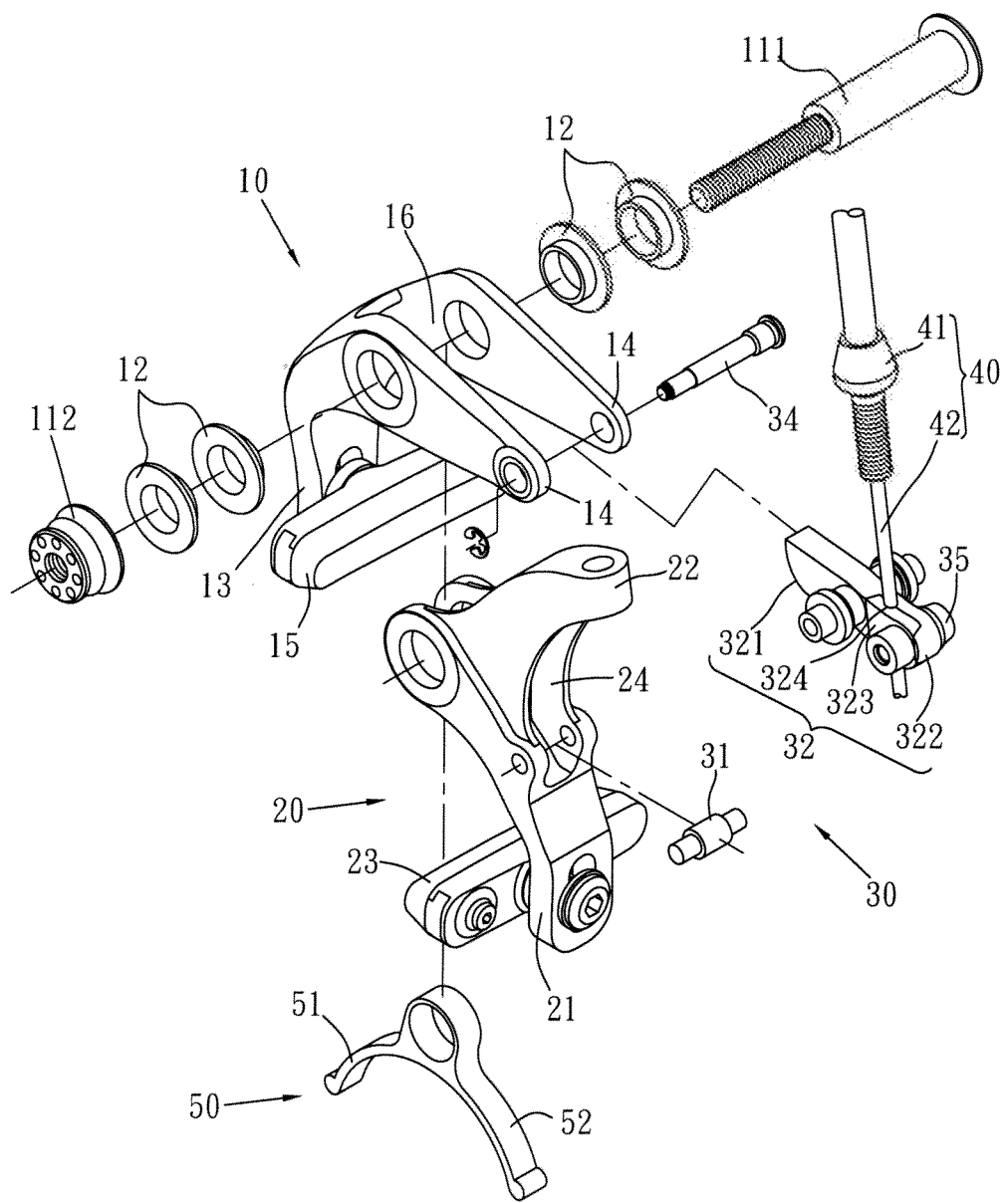
FIG. 3 is an exploded view to show the brake system of the present invention.
Figure 4:
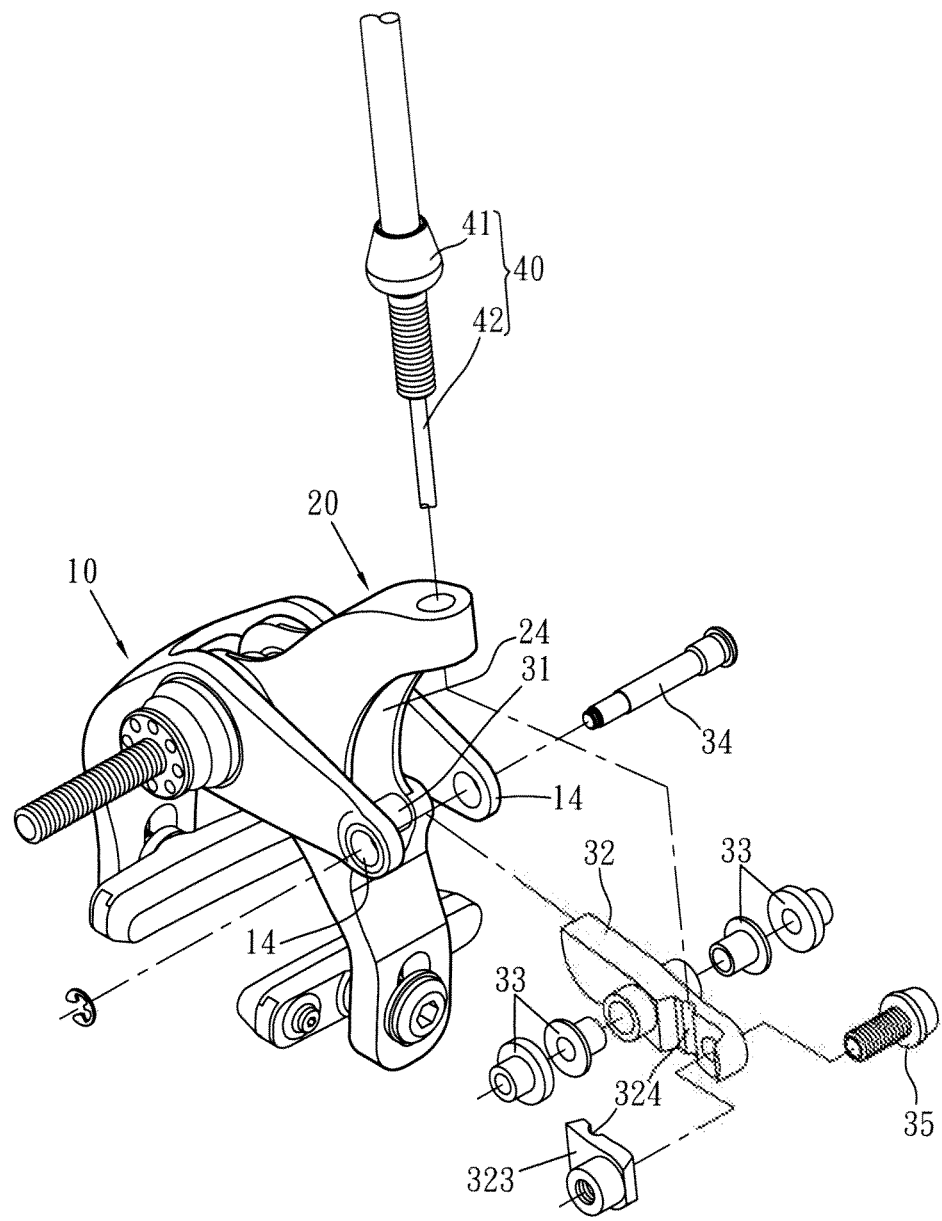
FIG. 4 is another exploded view to show the brake system of the present invention.
Figure 5:
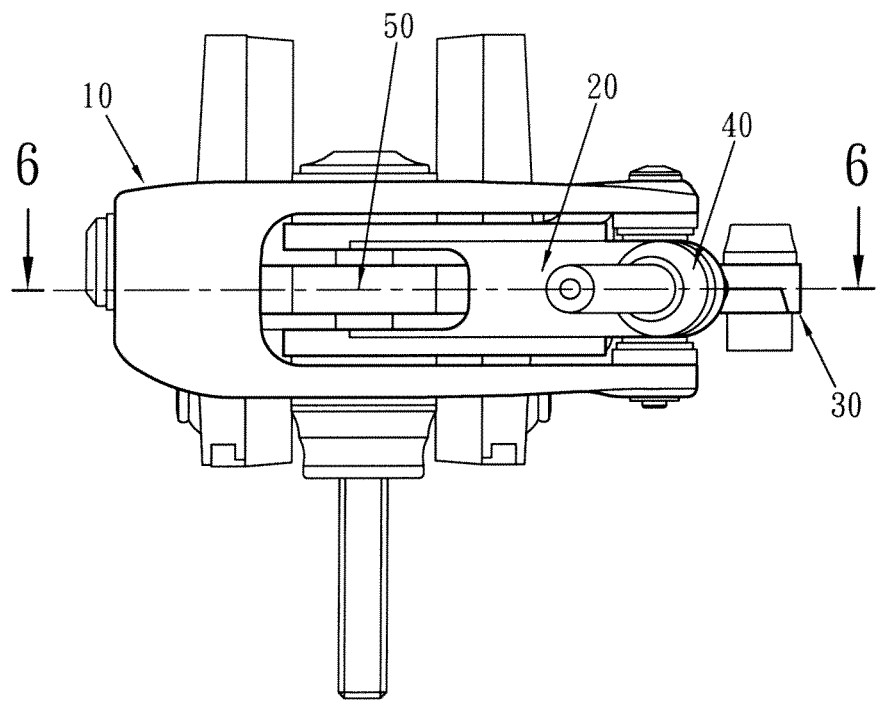
FIG. 5 is a top view of the brake system of the present invention.
Figure 6:
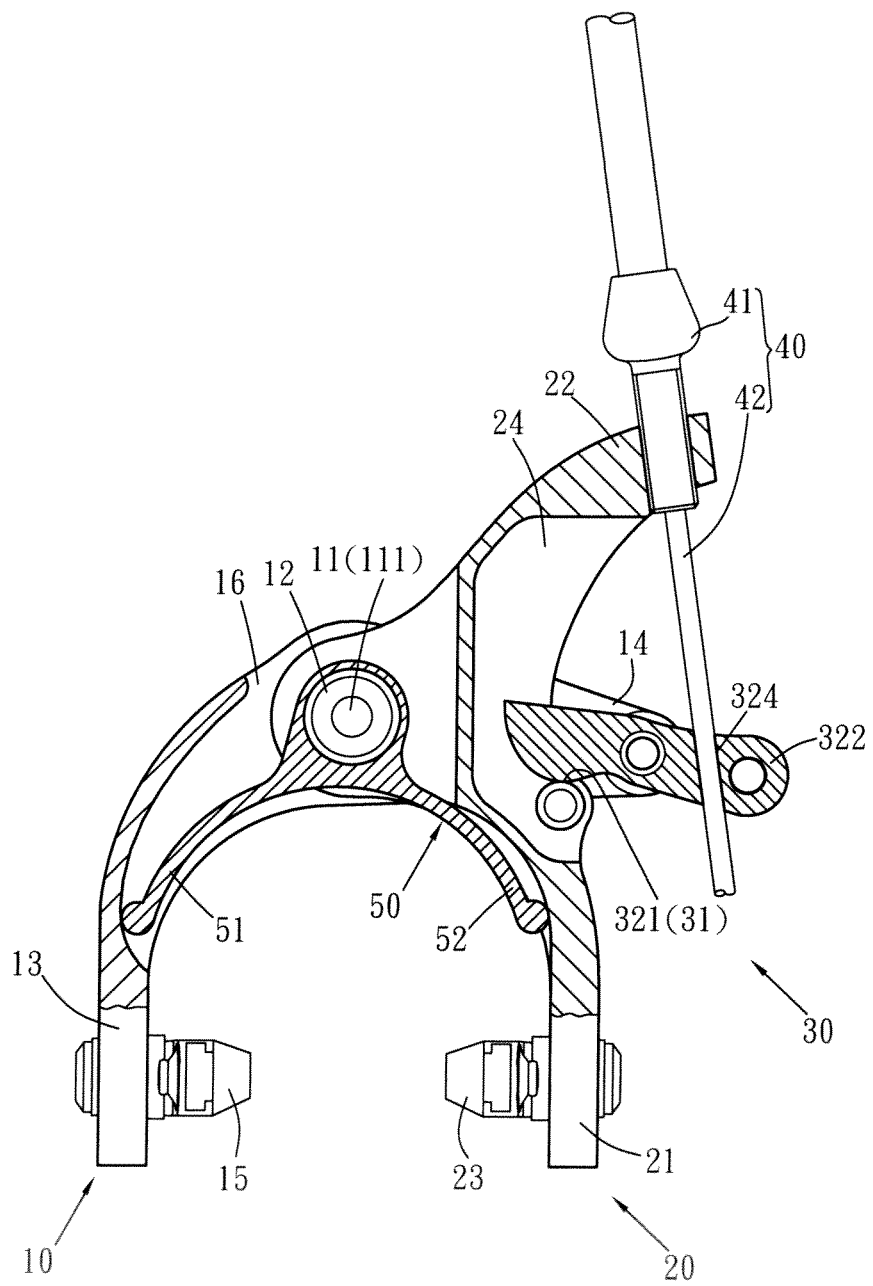
FIG. 6 is a partial cross sectional view of the brake system of the present invention.

Referring to FIGS. 1 to 6, the bicycle brake system of the present invention is located across a wheel rim 60 and comprises a first arm unit 10, a second arm unit 20, two operation units 40 cooperated with the first and second arm units 10, 20, and a cam unit 30.

The first arm unit 10 comprises a pivot portion 11 which is located between a first arm 13 and a first pivotal end 14. Four bushes 12 are engaged with the pivot portion 11 and are made of plastic steel. An engaging slot 16 is defined between two extensions of the first pivotal end 14. A first brake pad 15 is connected to the first arm 13 and faces the wheel rim 60.

The second arm unit 20 is located in the engaging slot 16 and has a pivot portion pivotably connected with the pivot portion 11. A pin 111 extends through the bushes 12 and the first and second arm units 10, 20. A nut 112 is fixed to the distal end of the pin 111. A pivot portion of the second arm unit 20 is located between a second arm 21 and a connection portion 22. A second brake pad 23 is connected to the second arm 21 and faces the wheel rim 60. The first and second arms 13, 21 are symmetrically located on two sides of the wheel rim 60. A reception recess 24 is defined in an outer surface of a mediate portion of the second arm unit 20.

The cam unit 30 has a contact piece 31 located in the reception recess 24 of the second arm unit 20. A cam member 32 has a pivotal portion pivotably connected to the pivotal end 14 by extending through bushes 33 engaged with the pivotal portion of the cam member and the pivotal end 14 of the first arm unit 10 so that the cam member 32 is pivotably located in the engaging slot 16. Again, the bushes 33 are made of plastic steel. The cam member 32 includes a guide portion 322 and a cam portion 321 on two ends thereof. The cam portion 321 has a curved surface which is in contact with the contact piece 31. The guide portion 322 includes an engaging member 323 connected to the cam member 32, a hole 324 is defined between the engaging member 323 and the cam member 32.

The operation unit 40 has a positioning member 41 which is secured to the connection portion 22 and a cable 42 extends through the positioning member 41 located at an end of the connection portion 22 and is fixed to the guide portion 322 by an urging bolt 35. The positioning member 41 at the end of the connection portion 22 and the guide portion 322 are located on a common axis so that the cable 42 is maintained to be straight within bent portion.

A resilient member 50 has two resilient extensions 51, 52 which are in contact with the insides of the first and second arms 13, 21 respectively so as to keep a distance between the first and second arms 13, 21 and to provide a bounce force to the first and second arms 13, 21.

Figure 7:
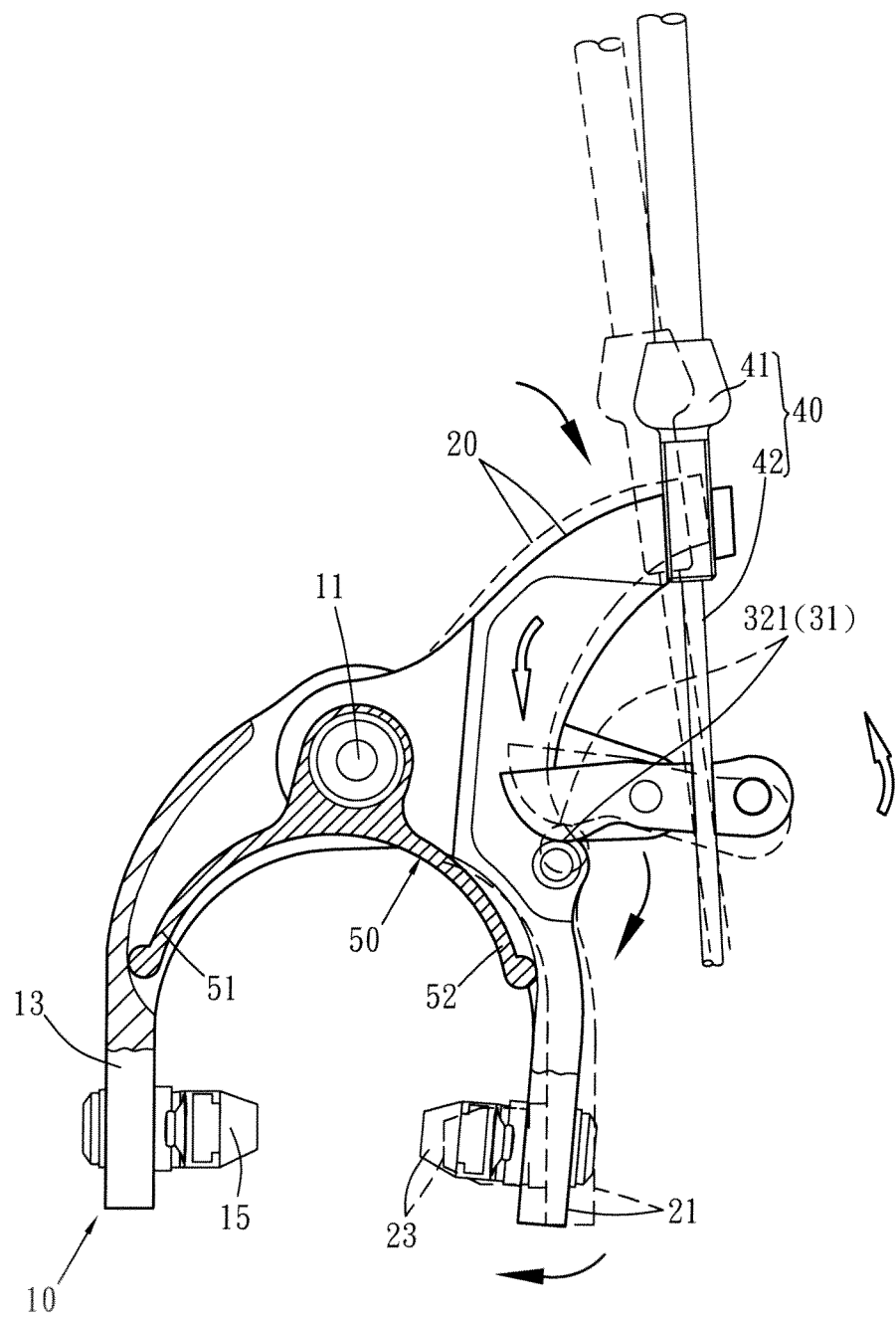
FIG. 7 shows the operation of the brake system of the present invention.

Referring to FIG. 7, the dotted lines show that the brake system has not been operated, when the rider activates the brake system, the cable 42 is pulled upward and the cam member 32 is rotated in counter clockwise as shown by the hollow arrowhead. The cam portion 321 contacts the contact piece 31 which is moved clockwise by the curved surface of the cam portion 321, and the second arm 21 is pivoted clockwise as shown in solid arrowhead. Therefore, the second brake pad 23 moves and contacts the wheel rim 60 to stop the wheel.

When releasing the force applied to the cable 42, the resilient member 50 bounces the second arm 21 and the second brake pad 23 counter clockwise, and the contact piece 31 pushes the cam portion 321 clockwise. The cam member 32 is pivoted clockwise so that the engaging member 322 and the cable 42 move back to their original positions.

The contact piece 31 is connected to the second arm 21 and the cam member 32 on the first arm 13, so that the cam member 32 is not directly in contact with the second arm 31. When the contact piece 31 and/or the cam member 32 need to be replaced, the first and second arm units 10, 20 need not to be dispatched from the bicycle and only the contact piece 31 and/or the cam member 32 are replaced.

The contact piece 31 is easily machined and can be machined to desired requirement at low cost.

The first and second arm units 10, 20 are symmetrically and pivotably connected to each other by engaging the second arm unit 20 with the engaging slot 16 in the first arm unit 10. This arrangement has two advantages, one of which is that the two resilient extensions 51, 52 of the resilient member 50 are in contact with the first and second arms 13, 21 such that the resilient member 50 does not tilt and has better bouncing function. The other advantage is that the cam member 32 is connected to the first arm unit 10 and the operation unit 40 is connected to the second arm unit 20, so that the positioning member 41 and the hole 324 are located on a common axis and this makes the cable 42 to be straight without bent portion. This makes the cable 42 to be operated smoothly.

While we have shown and described the embodiment in accordance with the present invention, it should be clear to those skilled in the art that further embodiments may be made without departing from the scope of the present invention.

What is claimed is:

1. A bicycle brake system located across a wheel rim and comprising:

a first arm unit having a first pivot portion which is located between a first arm and a first pivotal end, an engaging slot defined in the first pivotal end, a first brake pad connected to the first arm and adapted to face the wheel rim;

a second arm unit located in the engaging slot and having a second pivot portion pivotably connected with the first pivot portion, the second pivot portion located between a second arm and a connection portion, a second brake pad connected to the second arm and adapted to face the wheel rim, the first and second arms adapted to be symmetrical to two sides of the wheel rim;

a cam unit having a contact piece detachably connected to the second arm unit, a cam member having a pivotal portion pivotably connected to the pivotal end and located in the engaging slot, the cam member including a guide portion and a cam portion on two ends thereof, the cam portion having a curved surface which is in contact with the contact piece; and an operation unit connected to the connection portion and having a cable which extends through an end of the connection portion and is fixed to the guide portion, the end of the connection portion and the guide portion located on a common axis, the cam member and the second arm unit being pivoted by pulling the cable, the contact piece being pushed by the cam member to change a distance between the first and second brake pads.

2. The system as claimed in claim 1, wherein the operation unit has a positioning member fixed to the connection portion and the cable movably extends through the positioning member.

3. The system as claimed in claim 1, wherein the guide portion includes an engaging member connected to the cam member, a hole is defined between the engaging member and the cam member so that the cable is fixed in the hole, the operation unit has a positioning member fixed to the connection portion, the positioning member and the hole are located on a common axis so that the cable does not bend.

4. The system as claimed in claim 1, wherein a reception recess is defined in an outer surface of a mediate portion of the second arm unit and the contact piece is located in the reception recess.

5. The system as claimed in claim 1, wherein a resilient member has two resilient extensions which are in contact with the first and second arms respectively so as to keep a distance between the first and second arms.

6. The system as claimed in claim 1, wherein the first pivot portion has at least one bush and a pin extends through the at least one bush and the first and second arm units, a nut is securely connected to the pin.

7. The system as claimed in claim 6, wherein the at least one bush is made of plastic steel.

8. The system as claimed in claim 1, wherein the contact piece is rotatable about an axis thereof.

9. The system as claimed in claim 1, wherein the pivotal portion of the cam member has at least one bush.

10. The system as claimed in claim 9, wherein the at least one bush is made of plastic steel.

\* \* \* \* \*